Oct. 6, 1942. D. E. HARNETT Re. 22,195

COUPLING SYSTEM Orig. 2,066,777

Original Filed July 11, 1935 2 Sheets-Sheet 1

INVENTOR
DANIEL E. HARNETT
BY Harry B. Page
ATTORNEY

Oct. 6, 1942. D. E. HARNETT Re. 22,195

COUPLING SYSTEM

Original Filed July 11, 1935 2 Sheets-Sheet 2

INVENTOR
DANIEL E. HARNETT
BY Harry B. Page
ATTORNEY

Reissued Oct. 6, 1942

Re. 22,195

UNITED STATES PATENT OFFICE 22,195

COUPLING SYSTEM

Daniel E. Harnett, Tuckahoe, N. Y., assignor to Hazeltine Corporation, a corporation of Delaware Original No. 2,066,777, dated January 5, 1937, Serial No. 30,777, July 11, 1935. Application for reissue April 4, 1939, Serial No. 265,953

15 Claims. (Cl. 178—44)

Figure 1:
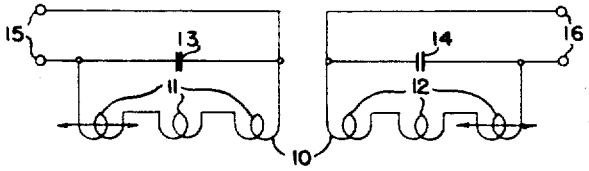

This invention relates to coupling systems and particularly to methods of and means for adjusting the self-inductance of inductively coupled windings of such systems without changing the coefficient of coupling therebetween.

While my invention is of general application, it is especially adapted for use in connection with tuned selector systems, such as the intermediate-frequency selector systems of superheterodyne radio receivers.

By reason of necessary manufacturing tolerances and of differences in reflected and stray reactances, such as tube capacitances and wiring capacitances, it is necessary that circuits of a system which are to be tuned to the same frequency be aligned, that is, that their reactances be readjusted, after the system has been assembled. Heretofore, it has been the general practice to accomplish such alignment by adjusting condensers of the circuits. While this practice has proved satisfactory to a certain extent, various objections are inherent thereto. It has been found, for instance, that the capacitances of adjustable condensers of the types ordinarily employed are subject to considerable variation with age, changes in temperature and humidity, and from shocks and vibration. Fixed condensers, on the other hand, are obtainable which are substantially more stable under similar conditions, and their use is therefore highly desirable. Such use, however, necessitates alignment of the circuits in which they are employed by the adjustment of the inductances thereof. Ordinarily, the tuning inductances of such adjacent circuits serve also to couple the circuits in the system and any change of the inductances results in a corresponding change in the coefficient of coupling between the circuits and the selectivity of the system. In general, however, it is essential that the coefficient of coupling of the system be unaltered. The ideal arrangement, therefore, calls for a system including circuits employing fixed condensers and inductively coupled windings, the self-inductances of which may be varied without changing the coefficient of coupling therebetween.

An object of the present invention is to provide an improved method of and means for adjusting the self-inductance of inductively coupled windings of a coupling system without changing the coefficient of coupling therebetween.

More particularly, an object of the invention is to provide an improved method of and means for adjusting the tuning of selector circuits embodying fixed condensers and inductively coupled windings, by varying the self-inductances of the windings without changing the coefficient of coupling therebetween.

Various other and further objects of, and advantages achieved by, this invention will be apparent from the description hereinafter set forth of certain approved embodiments thereof.

In accordance with the present invention, the self-inductances of a pair of inductively coupled windings are adjusted and the mutual-inductance coupling between the windings is simultaneously adjusted in the same sense and in such proportion as to maintain the coefficient of coupling therebetween substantially constant. In a preferred embodiment of the invention the windings are employed as tuning elements of tuned circuits of a selector system. Each of the windings is preferably divided into a plurality of sections and all of the sections are coaxially mounted on telescopically engaging forms. For example, the proximate sections of the two windings may be relatively fixedly mounted on an intermediate form and the remote portions on relatively movable end forms. Telescopic movement of either end form relative to the intermediate form changes the relative position of the sections of the respective winding so as to vary its self-inductance. With such an arrangement, the mutual-inductance coupling between the sections of each winding is thus varied to change the self-inductance of the respective winding, that is, the inductance individual to a particular circuit. This variation is accompanied by a smaller change in the mutual-inductance coupling between the two circuits. The variation of the mutual-inductance coupling between the circuits may be of the order of the square root of the self-inductance variations, resulting in a substantially constant coefficient of coupling between the circuits.

Figure 2:
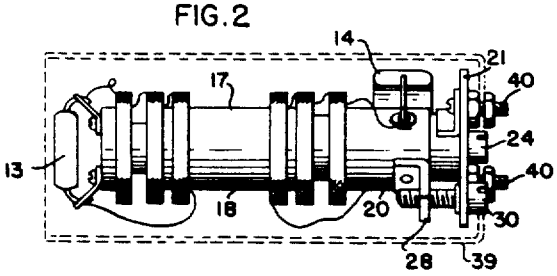
Figure 3:
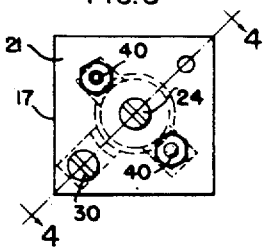
Figure 4:
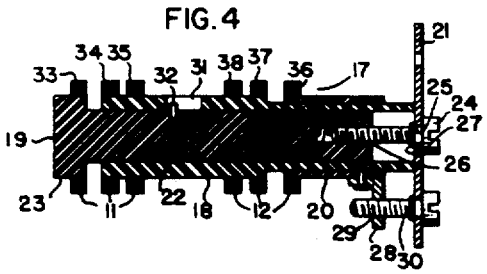
Figure 5:
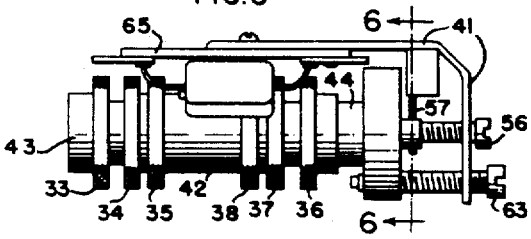
Figure 6:
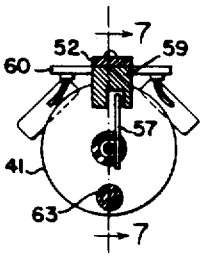
Figure 7:
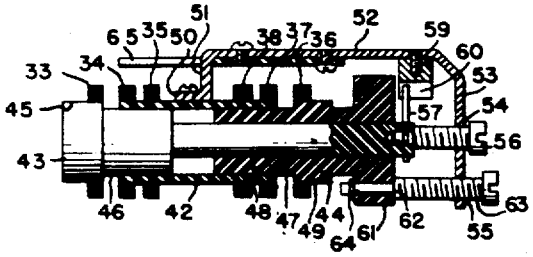
Figure 8:
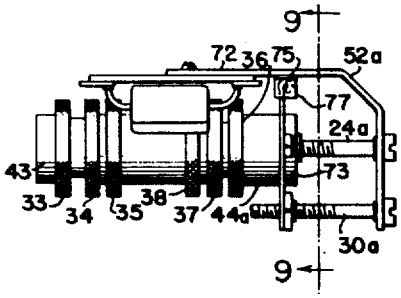
Figure 9:
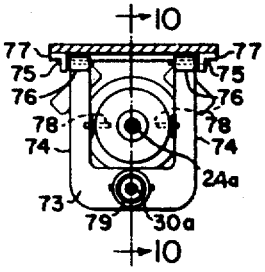
Figure 10:
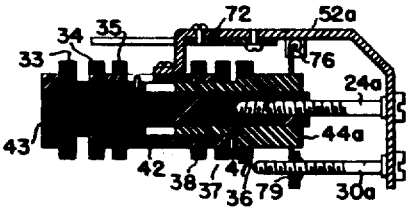
Figure 11:
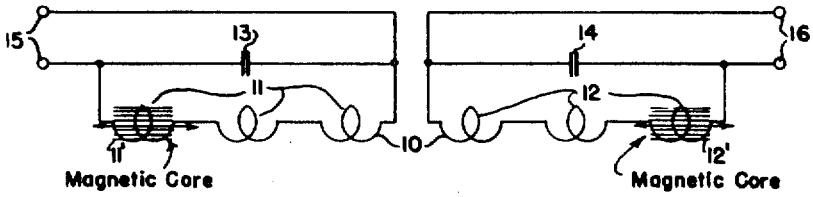

In the accompanying drawings, Fig. 1 is a simplified circuit diagram illustrating the present invention; Fig. 2 is a side elevation of a coupling device embodying the invention; Fig. 3 is an end view of the device shown in Fig. 2; Fig. 4 is a longitudinal section of the device shown in Figs. 2 and 3, taken on the line 4—4 of Fig. 3, with the condensers omitted; Fig. 5 is a side elevation of a modified form of the coupling device of Fig. 2; Fig. 6 is a transverse section on the line 6—6 of Fig. 5; Fig. 7 is a longitudinal section of the device shown in Fig. 5, taken on the line 7—7 of Fig. 6, with the condensers omitted; Fig. 8 is a side elevation of another modified form of the coupling device; Fig. 9 is a transverse section on the line 9—9 of Fig. 8; Fig. 10 is a longitudinal section of the device shown in Fig. 8, taken on the line 10—10 of Fig. 9, with the condensers omitted; while Fig. 11 illustrates schematically an embodiment of the invention similar to that of Fig. 1, in which the self-inductance of each of the windings is adjustable by means of an adjustable magnetic core associated with the remote sections of the windings.

Referring in detail to Fig. 1, the invention is here diagrammatically illustrated as employed in connection with a selector system such as is commonly used in the intermediate-frequency amplifier section of a superheterodyne radio receiver. This system comprises a coupling device 10, which includes coaxially arranged primary and secondary windings 11 and 12, each divided into a plurality of sections, as indicated. The windings 11 and 12 are preferably mutually external, that is, they are entirely separated physically and no part of either extends into or over the other. Fixed condensers 13 and 14 are connected across the windings 11 and 12, respectively, in the usual manner, and input and output terminals 15 and 16 are connected across the primary and secondary circuits, respectively. A coupling is provided between the primary and secondary circuits, principally by mutual inductances between the proximate sections of the windings 11 and 12.

With the circuits just described syntonously tuned, a selector system is provided which, according to well-known principles, is adapted to pass a band of frequencies symmetrical with respect to a median frequency. To permit proper alignment of the circuits, means are provided whereby the self-inductance of each of the windings is adjustable by changing the mutual inductance between sections of each winding, which are relatively remote from the other winding, as indicated by the arrows in Fig. 1. The arrows are intended to denote that the mutual inductances between the outer end sections of the windings and their respective intermediate sections may be varied. The mutual inductance between the sections of the respective windings which are proximate to each other is, however, maintained unchanged. By varying the self-inductances of the windings in this manner, the total mutual-inductance coupling between the two circuits may be varied and such variation may be of the order of the square root of the self-inductance variation of the windings, so that the coefficient of coupling between the circuits remains substantially unchanged.

That the coefficient of coupling will remain unchanged will be readily appreciated upon consideration of the well-known formula:

$$k=\frac{M}{\sqrt{L_1L_2}}$$

where $k$ is the coefficient of coupling; $L_1$ and $L_2$, the self-inductances of the primary and secondary windings, respectively; and M, the mutual-inductance coupling between the windings.

For constant coefficient of coupling:

$$k=\frac{M'}{\sqrt{L_1L_2'}}=\frac{M}{\sqrt{L_1L_2}}$$

where $L_2'$ equals the self-inductance of the secondary winding after adjustment, and M' equals the mutual-inductance coupling after adjustment. From this formula I derive:

$$\frac{M'}{M}=\sqrt{\frac{L_2'}{L_2}}$$

Referring to Figs. 2–4, there is illustrated a preferred form of a coupling device suitable for use in connection with my invention, indicated generally by the numeral 17. The device 17 comprises three telescopically engaging cylindrical forms, including an annular intermediate form 18 and end forms 19 and 20. The form 18 is rigidly secured to a supporting end plate 21. The end form 19 includes an elongated stem 22, which telescopically extends into the form 18, and an enlarged head 23 of the same outer diameter as the form 18. An adjusting screw 24 is rotatably mounted in an opening 25 in the plate 21 and engages a threaded axial opening 26 formed in the stem 22. A suitable clip 27 engages the screw at one side of the plate and, together with the head of the screw at the other side of the plate, prevents axial movement of the screw relative to the plate. It will be apparent that, by turning the screw 24, axial movement of the form 19 in either direction relative to the form 18 may be effected.

The form 20 is hollow and is telescopically mounted on the inner end portion of the form 18. A radially extending bracket 28 is secured to the form 20 and is provided with a threaded opening 29. An adjusting screw 30 is held in the end plate 21, similarly to screw 24, and engages the bracket 28 in its opening 29. The form 20 may be axially moved relative to the form 18 by rotation of its adjusting screw, in the same manner as the form 19.

The form 18 is provided with a longitudinal slot 31 near the central portion thereof, with which cooperates a pin 32 secured in the form 19 and serving to prevent relative rotation of the forms 18 and 19 and to limit the relative axial movement therebetween.

The primary winding 11 is constructed in three separate sections 33, 34 and 35, commonly known as pies, which are connected in series. The portion 33 is mounted on the head 23 of the form 19, and the portions 34 and 35 are mounted on the form 18, as illustrated. In similar manner, the secondary winding 12 includes three separate sections 36, 37 and 38 which are connected in series, the portion 36 being mounted on the form 20 and the portions 37 and 38 being mounted on the form 18. The intermediate sections 34, 35, 37 and 38 are thus relatively fixed, while the end sections 33 and 36 of the two windings are movable in either direction with their respective forms 19 and 20 upon rotation of their respective adjusting screws 24 and 30. The self-inductances of the windings 11 and 12 may thus be adjusted without changing the coefficient of coupling between the windings, as above described, and the adjustable means for varying the self-inductance of each of the windings is adjustable from the same end of the windings.

As shown in Fig. 2, the coupling device 17 is preferably disposed within a tubular shield 39 and suitably secured to an end plate thereof by bolts 40. The condensers 13 and 14, which are connected across the windings, are also preferably disposed within the shield and rigidly secured on the coupling device 17 by suitable brackets.

In Figs. 5–7, there is illustrated a modified form of coupling device, indicated generally by the numeral 41. The device 41 includes a hollow cylindrical intermediate form 42, and two cylindrical end forms 43 and 44. The form 43 includes a head 45 of substantially the same diameter as the form 42, a central portion 46, which telescopically extends into the form 42, and an elongated stem 47 which extends through and beyond the form 42. The form 44 telescopically extends into the form 42 and is provided with a central bore through which extends the stem 47 of the form 43. The form 44 includes an enlarged portion 49 of the same diameter as the form 42.

The form 42 is secured to a flange 50 formed on an arm 51 of a substantially U-shaped bracket 52. The other arm 53 of the bracket 52 extends opposite the adjacent ends of the form 44 and stem 47 and is provided with two threaded openings 54 and 55. An adjusting screw 56 is threaded in the opening 54 and extends into a recess axially formed in the stem 47 and is rotatably secured to the stem and held against axial movement relative thereto by means of a pin 57, which extends transversely through the stem 47 and engages an annular groove 58 formed in the end portion of the screw.

A guide block 59 is secured to the bracket 52 and is provided with a slot 60 which extends in the same direction as the stem 47. An end of the pin 57 projects into the slot 60 and serves to prevent rotation of the form 43.

An enlarged end portion or flange 61 is formed on the form 44 and is provided with a longitudinal opening 62. A second adjusting screw 63 is threaded in the opening 55 and includes an end portion of relatively small diameter, which extends through the opening 62. A suitable clip 64 holds the form 44 against longitudinal movement relative to the screw 63.

Rotation of the screws 56 and 63 serves to effect movement of the forms 43 and 44, respectively, relative to the stationary form 42 in substantially the same manner as described with reference to the adjusting screws and forms of the device 17. The heads of the screws 56 and 63 limit the movements of the forms 43 and 44, respectively, in one direction, and the head 43 and the block 59 limit their respective movements in the opposite direction.

The bracket 52 may be secured to a suitable support 65 or to a shield, as desired.

The windings of the device 41 are constructed and supported similarly to the windings of the device 17, the outer winding portions 33 and 36 being carried by the end forms 43 and 44, respectively, and the other winding portions 34, 35, 37 and 38 being carried on the form 42, as shown.

In Figs. 8–10 there is illustrated a further modified form of coupling device, indicated generally by the numeral 72. The device 72 is substantially the same as the device 41 shown in Figs. 5–7, excepting that the adjusting means for the end forms are differently constructed.

Those parts only of the device 72 which differ from the device 41 will be described in detail. A U-shaped yoke 73 is pivotally secured at the ends of its arms 74 to the bracket 52a, which corresponds to the bracket 52 of the device 41, by means of pins 75 which are passed through ears 76 formed on the ends of the arms 74 and through lugs 77 secured to the bracket 52a.

Pin members 78 are secured to the inner sides of the arms 74 and pivotally engage the end of the form 44a at the opposite sides thereof. An internally threaded ring 79 is pivotally secured in an opening provided therefor in the cross member of the yoke 73, as illustrated. An adjusting screw 30a is secured to the bracket 52 and is threaded in the ring 79 in substantially the same manner as the screw 30 is secured to the plate 21 and engages the bracket 28 in the device 17. The yoke arrangement described insures a symmetrical application of the actuating forces of the screw 30a upon the form 44a, so as to obviate any tendency toward binding or eccentric movement of this form during its adjustment.

An adjusting screw 24a is secured to the bracket 52a and engages the stem of the form 43a, respectively, substantially in the same manner as the screw 24 is secured to the plate 21 and engages form 19 in the device 17. The adjusting screws 24a and 30a are operable to effect relative movements of the forms of the device 72 similarly to the adjusting screws of the other embodiments. Likewise, the separate portions of the windings are similarly mounted on forms so that the respective outer end sections of the windings are moved inwardly and outwardly, relative to the intermediate sections thereof, by the rotation of the adjusting screws, while the intermediate portions are held in fixed relative positions.

A satisfactory embodiment of the present invention, constructed in the form of the device 17, shown in Figs. 2–4, may have the following specifications:

Windings 11 and 12—
- 6 coil portions—each portion 95 turns 7 strands No. 40 Litz S. S. C. universal wound gears 36/38; ⅝" i. d., ⅛" w., impregnated.

Distance between portions 35 and 38 ---- ⅝"

Distance between portions 34 and 35, 37 and 38 ---- $\frac{1}{16}$"

Range of motion of the portions 33 and 36 relative to portions 34 and 37 respectively ---- ⅛"

Windings mounted in shielding can 1⅜" square 3½" long.

Transformer to operate at approximately 460 kilocycles.

From the foregoing description it will be understood that the coupling devices herein disclosed are capable of being adjusted to vary the self-inductance of each of the sectionalized windings without any appreciable change in the coefficient of coupling therebetween. This is due to the small change in the mutual-inductance coupling between the windings in the same sense and to a lesser degree than the change in the self-inductance of either or both of the adjusted windings. The small change in mutual-inductance coupling is, in turn, due, in general, to the proportioning and spacing of the winding sections in the manner described in the preceding paragraph, whereby the adjustable winding sections do not constitute the major portion of the total inductance of their respective windings. In certain applications a considerable percentage departure in the mutual-inductance coupling between the two windings from the preferred square-root relationship is tolerable. For example, in the application mentioned, wherein the device is used as a means for aligning the intermediate-frequency amplifier stages of a superheterodyne receiver, a change in the mutual-inductance coupling which, together with the corresponding changes in the self-inductances of the windings, results in a percentage change in the coefficient of coupling of the order of a few per cent, such, for example, as a change from .02 to .0205, does not adversely affect the operation of the receiver. The relative importance of the above factors is, of course, determined by the particular system or application in which the coupling device is to be used.

While certain preferred embodiments of the invention have been heretofore described, it will be understood that many and various changes and modifications in the application of the invention, and in the form, structure and parts of the various embodiments thereof, may be made without departing from the spirit of the invention. For instance, the invention is not confined to changing the self-inductance of the respective circuits by varying the relative positions of portions of the coils, but the principles of the invention may be practiced in various other suitable ways, as, for example, by changing the self-inductances of the individual windings by adjusting the relative positions of magnetic cores employed in connection with the remote sections of the windings. An arrangement of this kind is shown schematically in Fig. 11 of the drawings. The inductance unit of Fig. 11 is, in general, similar to that of Fig. 1 and corresponding elements have the same reference numerals. The only difference between the arrangements of Fig. 1 and Fig. 11 resides in the fact that in the inductance unit of Fig. 11 the self-inductance of each of windings 11 and 12 is adapted to be adjusted by adjusting the position of a magnetic core 11′ or 12′ associated with the remote section thereof. It will also be apparent that, if desired, only one of the windings may be made adjustable. Further, any suitable number of separate winding sections may be utilized with either one or a greater part of the total number of sections of each winding held fixed and with either one or a greater part of the total number of the portions movable. It will, therefore, be understood that the appended claims are intended to cover all and any such applications, changes and modifications as fall fairly within the true spirit of the invention.

What is claimed is:

1. A coupling system comprising a pair of inductively coupled windings and means for adjusting the self-inductance of one of said windings without substantially changing the coefficient of coupling therebetween, comprising means for varying the self-inductance of said one of said windings independently of and without appreciably changing the self-inductance of the other of said windings and simultaneously varying the mutual-inductance coupling between said windings in the same sense and in such proportion as to maintain said coefficient of coupling substantially constant.

2. A coupling system comprising a pair of inductively coupled windings and means for adjusting the self-inductance of one of said windings without substantially changing the coefficient of coupling therebetween, comprising means for varying the self-inductance of said one of said windings independently of and without appreciably changing the self-inductance of the other of said windings and simultaneously varying the mutual-inductance coupling between said windings as the order of the square root of said self-inductance variation.

3. A coupling system comprising a pair of inductively coupled windings and means for adjusting the self-inductance of one of said windings without substantially changing the coefficient of coupling therebetween, comprising means for varying the mutual inductance between certain of the turns of said one of said windings independently of and without appreciably changing the self-inductance of the other of said windings and simultaneously varying the mutual-inductance coupling between said coupled windings in the same sense and in such proportion as to maintain said coefficient of coupling substantially constant.

4. A coupling system comprising a pair of inductively coupled windings having relatively proximate portions and relatively remote portions, and means for adjusting the self-inductance of one of said windings without substantially changing the coefficient of coupling therebetween, comprising means for adjusting the relative positions of portions of said one of said windings while maintaining the respective proximate portions of said coupled windings relatively fixed.

5. A coupling system comprising a pair of inductively coupled mutually external coaxial windings, each of said windings have a plurality of substantially similar serially connected sections, and means for adjusting the self-inductance of either of said windings without substantially changing the coefficient of coupling therebetween, comprising means for adjusting the relative positions of said sections so as to vary the mutual inductance therebetween while maintaining constant the mutual inductance between the respective proximate portions of said two windings.

6. A coupling system comprising a pair of inductively coupled, mutually external, coaxial windings and means for adjusting the self-inductance of one of said windings without substantially changing the coefficient of coupling therebetween comprising means for varying the mutual inductance between portions of said one of said windings relatively remote from the other of said windings while maintaining substantially constant the mutual inductance between the respective proximate portions of said coupled windings.

7. A coupling device comprising a plurality of forms, a pair of inductively coupled windings carried on said forms, said windings having proximate portions carried by one of said forms and one of said windings having another portion thereof carried by a second of said forms, and means for adjusting the relative positions of said two forms to vary the self-inductance of said one winding independently of and without appreciably changing the self-inductance of the other winding and simultaneously to vary the mutual-inductance coupling between said windings in the same sense and in such proportion as to maintain the coefficient of coupling substantially constant.

8. A coupling device comprising a plurality of telescopically engaging forms, a pair of inductively coupled windings carried by said forms, said windings having proximate portions carried by one of said forms and one of said windings having another portion thereof carried by a second of said forms, and means for telescopically moving one of said two forms relative to the other to vary the self-inductance of said one winding and simultaneously to vary the mutual-inductance coupling between said windings in the same sense and in such proportion as to maintain the coefficient of coupling substantially constant.

9. A coupling device comprising three telescopically engaging forms, a pair of inductively coupled windings having proximate portions carried by an intermediate one of said forms and each of said windings having a second portion carried by another of said forms, and means for telescopically moving either of said other forms relative to said intermediate form to vary the self-inductance of either of said windings and simultaneously to vary the mutual-inductance coupling between said windings in the same sense and in such proportion as to maintain the coefficient of coupling substantially constant.

10. A selector system comprising two tuned circuits having fixed capacitances and inductively coupled windings, and means for adjusting the tuning of one of said circuits without substantially changing the coefficient of coupling therebetween, comprising means for varying the self-inductance of the winding of said one of said circuits independently of and without appreciably changing the self-inductance of the other winding and simultaneously varying the mutual-inductance coupling between said windings in the same sense and in such proportion as to maintain said coefficient of coupling substantially constant.

11. The method of adjusting the self-inductance of one of a plurality of inductively coupled windings without substantially changing the coefficient of coupling therebetween, which comprises varying the self-inductance of said one of said windings independently of and without appreciably changing the self-inductance of the other of said windings and simultaneously varying the mutual-inductance coupling between said windings as the order of the square root of said self-inductance variation.

12. In a coupling system comprising a plurality of coupled windings, the method of adjusting the self-inductance of one of said windings without substantially changing the coefficient of coupling therebetween, which comprises varying the mutual inductance between certain of the portions of said one of said windings independently of and without appreciably changing the self-inductance of the other of said windings and simultaneously varying the mutual-inductance coupling between the respective windings in the same sense and in such proportion as to maintain said coefficient of coupling substantially constant.

13. In a selector system comprising two tuned circuits having fixed capacitances and inductively coupled windings, the method of adjusting the tuning of one of said circuits without substantially altering the coefficient of coupling therebetween, which comprises varying the self-inductance of the winding of said one of said circuits independently of and without appreciably changing the self-inductance of the winding of the other of said circuits and simultaneously varying the mutual-inductance coupling between the respective windings in such proportion as to maintain said coefficient of coupling substantially constant.

14. A coupling system comprising a pair of inductively coupled windings and means for adjusting the self-inductance of each of said windings without substantially changing the coefficient of coupling therebetween, comprising adjustable means for varying the self-inductance of each of said windings independently of and without appreciably changing the self-inductance of the other of said windings, and simultaneously varying the mutual-inductance coupling between said windings in the same sense and in such proportion as to maintain said coupling substantially constant, said adjustable means for varying the self-inductance of each of said windings being adjustable from the same end of said windings.

15. A coupling system comprising a pair of inductively coupled mutually external coaxial windings, each of said windings having a plurality of serially-connected sections, and means for adjusting the self-inductance of each of said windings without substantially changing the coefficient of coupling therebetween comprising means for adjusting the relative positions of said sections so as to vary the mutual inductance therebetween while maintaining constant the mutual-inductance coupling between the proximate sections of said two windings, said adjusting means for both of said windings being operable from the same end of said coaxial windings.

DANIEL E. HARNETT.